US007785182B2

(12) United States Patent
Thomas et al.

(10) Patent No.: US 7,785,182 B2
(45) Date of Patent: Aug. 31, 2010

(54) WAGERING GAME HAVING SELECTABLE ARRAY FOR CREATING MULTIPLE HANDS

(75) Inventors: Alfred Thomas, Las Vegas, NV (US); Jeremy M. Hornik, Chicago, IL (US); Dion K. Aoki, Henderson, NV (US)

(73) Assignee: WMS Gaming Inc., Waukegan, IL (US)

( * ) Notice: Subject to any disclaimer, the term of this patent is extended or adjusted under 35 U.S.C. 154(b) by 329 days.

(21) Appl. No.: 11/435,566

(22) Filed: May 17, 2006

(65) Prior Publication Data

US 2006/0276242 A1 Dec. 7, 2006

Related U.S. Application Data

(63) Continuation-in-part of application No. 11/384,869, filed on Mar. 20, 2006, now abandoned.

(60) Provisional application No. 60/663,700, filed on Mar. 21, 2005.

(51) Int. Cl.
*A63F 13/00* (2006.01)
*A63F 1/18* (2006.01)

(52) U.S. Cl. ............................ 463/11; 463/12; 463/13; 463/22; 273/292; 273/293; 273/306

(58) Field of Classification Search ............. 463/10–13, 463/16–22, 25, 29, 40–42; 273/138.1, 139, 273/142 B, 142 A, 142 J, 148 A, 148 B, 149 P, 273/149 R, 274, 292–293, 304, 306, 309; *A63F 13/00, A63F 1/18*
See application file for complete search history.

(56) References Cited

U.S. PATENT DOCUMENTS

| | | | |
|---|---|---|---|
| 4,743,022 | A | 5/1988 | Wood |
| 5,294,120 | A | 3/1994 | Schultz |
| 5,308,065 | A | 5/1994 | Bridgeman et al. |
| 5,322,295 | A | 6/1994 | Cabot et al. |

(Continued)

FOREIGN PATENT DOCUMENTS

WO WO 97/27570 7/1997

OTHER PUBLICATIONS

Draw Poker Variants, web page (6 pages).

*Primary Examiner*—Peter DungBa Vo
*Assistant Examiner*—Arthur O. Hall
(74) *Attorney, Agent, or Firm*—Nixon Peabody LLP

(57) ABSTRACT

A method of playing a card-based wagering game. The method comprises conducting the card-based wagering game at a gaming terminal and displaying a plurality of cards arranged in an array. The plurality of cards includes a first set of selectable cards and a first set of non-selectable cards. The non-selectable cards are at least partially protected by others of the plurality of cards. One or more of the selectable cards are selected. A player's hand is created by removing the selected cards from the array, which then creates a second set of selectable cards and a second set of non-selectable cards in the array such that the second set of non-selectable cards are at least partially protected by others of the plurality of cards. It is then determined whether the player's hand is a winning hand.

20 Claims, 10 Drawing Sheets

U.S. PATENT DOCUMENTS 5,356,140 A * 10/1994 Dabrowski et al. ............ 463/12
5,401,023 A 3/1995 Wood
5,431,408 A 7/1995 Adams
5,437,451 A 8/1995 Fulton
5,489,101 A 2/1996 Moody
5,511,781 A 4/1996 Wood et al.
5,531,448 A 7/1996 Moody
5,732,950 A * 3/1998 Moody ....................... 273/292
5,772,506 A * 6/1998 Marks et al. .................. 463/13
5,816,916 A 10/1998 Moody
5,823,873 A 10/1998 Moody
5,868,619 A 2/1999 Wood et al.
5,882,258 A * 3/1999 Kelly et al. ................... 463/11
5,882,259 A 3/1999 Holmes, Jr.
5,882,260 A * 3/1999 Marks et al. .................. 463/13
5,954,335 A 9/1999 Moody
5,957,774 A 9/1999 Holmes, Jr. et al.
5,976,016 A 11/1999 Moody et al.
6,007,066 A 12/1999 Moody
6,012,720 A 1/2000 Webb
6,045,129 A 4/2000 Cooper et al.
6,048,267 A * 4/2000 Wichinsky ................... 463/13
6,098,985 A 8/2000 Moody
6,110,040 A 8/2000 Sanduski et al.
6,120,378 A 9/2000 Moody et al.
6,132,311 A 10/2000 Williams
6,149,521 A 11/2000 Sanduski
6,206,780 B1 3/2001 Awada
6,248,016 B1 6/2001 Walker et al.
6,257,979 B1 7/2001 Walker et al.
6,322,445 B1 * 11/2001 Miller ......................... 463/13
6,336,860 B1 1/2002 Webb
6,416,407 B1 7/2002 Carrico et al.
6,450,883 B1 * 9/2002 O'Halloran .................. 463/16
6,461,240 B1 10/2002 Perkins
6,471,587 B1 10/2002 Wood et al.
6,474,645 B2 11/2002 Tarantino
6,494,454 B2 12/2002 Adams
6,511,068 B1 * 1/2003 Sklansky et al. ............ 273/237
6,561,898 B2 5/2003 Moody
6,569,013 B1 5/2003 Taylor
6,569,014 B2 5/2003 Walker et al.
6,585,587 B2 * 7/2003 Falciglia, Sr. ................ 463/13
6,595,520 B1 * 7/2003 Richards et al. ............. 273/292
6,595,852 B2 7/2003 Wang
6,612,926 B1 9/2003 Dabrowski
6,612,927 B1 9/2003 Slomiany et al.
6,616,142 B2 9/2003 Adams
6,637,747 B1 10/2003 Garrod
6,652,377 B1 * 11/2003 Moody ........................ 463/13
6,672,958 B2 1/2004 Bennett
6,708,975 B1 3/2004 Fox et al.
6,726,427 B2 4/2004 Jarvis et al.
6,780,106 B2 8/2004 DeMar et al.
6,817,615 B1 * 11/2004 Dacey ........................ 273/292
6,857,957 B2 2/2005 Marks et al.
6,899,618 B2 * 5/2005 Colin et al. ................... 463/11
7,354,344 B2 * 4/2008 Paulsen et al. ................ 463/20
7,470,183 B2 * 12/2008 Wishart ....................... 463/16
7,614,946 B2 * 11/2009 Nicely ......................... 463/13
7,669,855 B1 * 3/2010 DiCarlo ...................... 273/292
2002/0034974 A1 3/2002 Wood et al.
2002/0169015 A1 11/2002 Moody
2002/0185816 A1 12/2002 Moody et al.
2003/0032469 A1 2/2003 Moody et al.
2003/0038425 A1 2/2003 Tarantino
2003/0064773 A1 4/2003 Baerloucher et al.
2003/0119572 A1 6/2003 Moody et al.
2003/0153377 A1 8/2003 Lisowski, Sr.
2003/0166411 A1 9/2003 Moody
2003/0181232 A1 9/2003 Peccola, Jr.
2003/0186733 A1 10/2003 Wolf et al.
2003/0189290 A1 10/2003 Moody
2003/0214097 A1 11/2003 Moody
2004/0033824 A1 * 2/2004 Fitzhugh ...................... 463/13
2004/0043807 A1 3/2004 Pennington
2004/0132524 A1 7/2004 Ramstad et al.
2004/0248641 A1 12/2004 Jarvis et al.
2005/0101387 A1 * 5/2005 Wolf ........................... 463/42
2005/0151319 A1 * 7/2005 Berman et al. .............. 273/292
2005/0230917 A1 * 10/2005 Jackson ...................... 273/292

* cited by examiner

WAGERING GAME HAVING SELECTABLE ARRAY FOR CREATING MULTIPLE HANDS

CROSS-REFERENCE TO RELATED APPLICATIONS

This application is a Continuation-In-Part of U.S. application Ser. No. 11/384,869, filed Mar. 20, 2006, now abandoned which claims priority of U.S. Provisional Patent Application No. 60/663,700, filed Mar. 21, 2005, both of which are hereby incorporated by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming terminals for playing a wagering game and, more particularly, to a wagering game having a unique feature to allow a player to select multiple cards from an array.

BACKGROUND OF THE INVENTION

Gaming terminals, such as slot machines, video poker machines, and the like, have been a cornerstone of the gaming industry for several years. Generally, the popularity of such terminals with players is dependent on the likelihood (or perceived likelihood) of winning money at the terminal and the intrinsic entertainment value of the terminal relative to other available gaming options. Where the available gaming options include a number of competing terminals and the expectation of winning at each terminal is roughly the same (or believed to be the same), players are most likely to be attracted to the most entertaining and exciting of the terminals.

Consequently, shrewd operators strive to employ the most entertaining and exciting terminals available because such terminals attract frequent play and, hence, increase profitability to the operator. In the competitive gaming terminal industry, there is a continuing need for gaming terminal manufacturers to produce new types of games, or enhancements to existing games, which will attract frequent play by increasing the entertainment value and excitement associated with the game.

One concept that has been successfully employed to enhance the entertainment value of a game is that of a "secondary" or "bonus" game which may be played in conjunction with a "basic" game. The bonus game may comprise any type of game, either similar to or completely different from the basic game, and is entered upon the occurrence of a selected event or outcome of the basic game. Such a bonus game produces a significantly higher level of player excitement than the basic game because it provides a greater expectation of winning than the basic game.

Another concept that has been employed is the use of a progressive jackpot. In the gaming industry, a "progressive" involves collecting coin-in data from participating gaming terminal(s) (e.g., slot machines), contributing a percentage of that coin-in data to a jackpot amount, and awarding that jackpot amount to a player upon the occurrence of a certain jackpot-won event. The percentage of the coin-in is determined prior to any result being achieved and is independent of any result. A jackpot-won event typically occurs when a "progressive winning position" is achieved at a participating gaming terminal. If the gaming terminal is a slot machine, a progressive winning position may, for example, correspond to alignment of progressive jackpot reel symbols along a certain payline. The initial progressive jackpot is a predetermined minimum amount. That jackpot amount, however, progressively increases as players continue to play the gaming terminal(s) without winning the jackpot. Further, when several gaming terminals are linked together such that several players at several gaming terminals compete for the same jackpot, the jackpot progressively increases at a much faster rate, which leads to further player excitement.

In many existing video card games, such as poker or blackjack, the player has to pay for every hand. The outcome of the card game is the only outcome, since the games often do not have bonus and/or progressive games. This diminishes player excitement. Once the player has won or lost the hand, there is no further payoff or reason for the player to continue playing the game. Thus, there is a need for a game providing multiple hands and/or a bonus award for achieving a particular outcome.

SUMMARY OF THE INVENTION

According to one embodiment of the present invention, a method of playing a card-based wagering game at a gaming terminal is provided. The method comprises receiving a wager. A plurality of cards is arranged in an array, such that the plurality of cards includes a first set of selectable cards and a first set of non-selectable cards. The non-selectable cards are at least partially protected by others of the plurality of cards. One or more of the selectable cards are selected and then removed from the array to create a player's hand. The removing of the selected cards further creates a second set of selectable cards and a second set of non-selectable cards in the array such that the second set of non-selectable cards are at least partially protected by others of the plurality of cards. It is then determined whether the player's hand is a winning hand.

According to another embodiment of the present invention, a gaming system for playing a card-based wagering game is provided. The gaming system includes a gaming terminal having an input device for receiving inputs from a player during the wagering game. The inputs include a wager amount. At least one display is also included. The at least one display displays a plurality of cards arranged in an array. The plurality of cards includes a first set of selectable and a first set of non-selectable cards, such that the first set of non-selectable cards are at least partially covered by others of the plurality of cards. The at least one display further displays a first player's hand, which includes one or more of the first set of selectable cards. In response to the selection of the first player's hand, a modified array is displayed, including the plurality of cards from the array with the exception of cards from the first player's hand. The modified array of cards includes a second set of selectable cards and a second set of non-selectable cards, such that the second set of non-selectable cards are at least partially covered by some of the plurality of cards in the modified array.

According to yet another embodiment of the present invention, a method of playing a card-based wagering game is provided. The method comprises displaying a plurality of cards arranged in an array. The plurality of cards includes a first set of selectable cards and a first set of non-selectable cards, such that the first set of non-selectable cards are protected by others of the plurality of cards. A first player hand is created from at least one player selection from the first set of selectable cards. Then, a modified array is displayed. The modified array includes at least some of the first set of non-selectable cards and any of the selectable cards that are not a part of the first player hand. The modified array includes a second set of selectable cards and a second set of non-selectable cards, such that the second set of non-selectable cards are protected by others of the plurality of cards. At least one player selection from the second set of selectable cards creates a second player hand.

BRIEF DESCRIPTION OF THE DRAWINGS

The foregoing and other advantages of the invention will become apparent upon reading the following detailed description and upon reference to the drawings.

Figure 1:
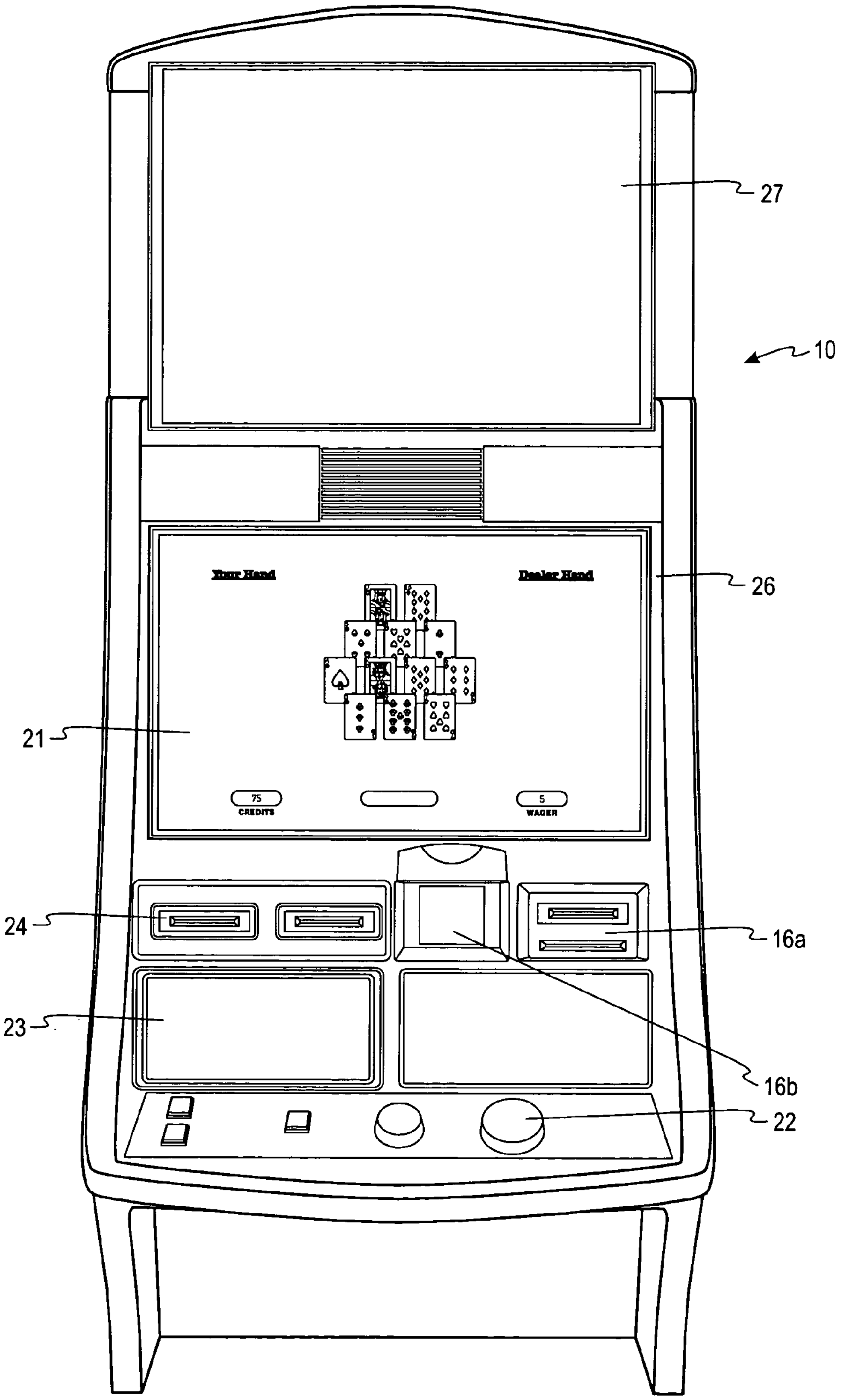
FIG. 1 illustrates a gaming terminal according to one embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

FIG. 1 shows a perspective view of a typical gaming terminal 10 used by gaming establishments, such as casinos. With regard to the present invention, the gaming terminal 10 may be any type of gaming terminal and may have varying structures and methods of operation. For example, the gaming terminal 10 may be an electrical gaming terminal configured to play video card games such as blackjack, solitaire, or poker.

As shown, the gaming terminal 10 includes input devices, such as a wager acceptor 16 (shown as a card wager acceptor 16*a* and a cash wager accepter 16*b*), a touch screen 21, a push-button panel 22, and an information reader 24. For outputs, the gaming terminal 10 includes a payout mechanism 23, a main display 26 for displaying information about the basic wagering game, and a secondary display 27 that may display an electronic version of a pay table, and/or also possibly game-related information or other entertainment features. While these typical components found in the gaming terminal 10 are described below, it should be understood that numerous other elements may exist and may be used in any number of combinations to create various forms of a gaming terminal.

The wager acceptor 16 may be provided in many forms, individually or in combination. The cash wager acceptor 16*b* may include a coin slot acceptor or a note acceptor to input value to the gaming terminal 10. The card wager acceptor 16*a* may include a card-reading device for reading a card that has a recorded monetary value with which it is associated. The card wager acceptor 16*a* may also receive a card that authorizes access to a central account, which can transfer money to the gaming terminal 10.

Also included is the payout mechanism 23, which performs the reverse functions of the wager acceptor 16. For example, the payout mechanism 23 may include a coin dispenser or a note dispenser to output value from gaming terminal 10. The payout mechanism 23 may also be adapted to receive a card that authorizes the gaming terminal to transfer credits from the gaming terminal 10 to a central account.

The push-button panel 22 is typically offered, in addition to the touch screen 21, to provide players with an option on how to make their game selections. Alternatively, the push-button panel 22 provides inputs for one aspect of operating the game, while the touch screen 21 allows for inputs needed for another aspect of operating the game.

The outcome of the basic wagering game is displayed to the player on the main display 26. The main display 26 may take the form of a cathode ray tube (CRT), a high resolution LCD, a plasma display, LED, or any other type of video display suitable for use in the gaming terminal 10. As shown, the main display 26 includes the touch screen 21 overlaying the entire monitor (or a portion thereof) to allow players to make game-related selections.

In some embodiments, the information reader 24 is a card reader that allows for identification of a player by reading a card with information indicating his or her true identity. Currently, identification is used by casinos for rewarding certain players with complimentary services or special offers. For example, a player may be enrolled in the gaming establishment's players' club and may be awarded certain complimentary services as that player collects points in his or her player-tracking account. The player inserts his or her card into the information reader 24, which allows the casino's computers to register that player's wagering at the gaming terminal 10. The information reader 24 may also include a keypad (not shown) for entering a personal identification number (PIN). The gaming terminal 10 may require that the player enter his or her PIN prior to obtaining information. The gaming terminal 10 may use the secondary display 27 for providing the player with information about his or her account or other player-specific information. Also, in some embodiments, the information reader 24 may be used to restore assets that the player achieved during a previous game session and had saved.

Figure 2:
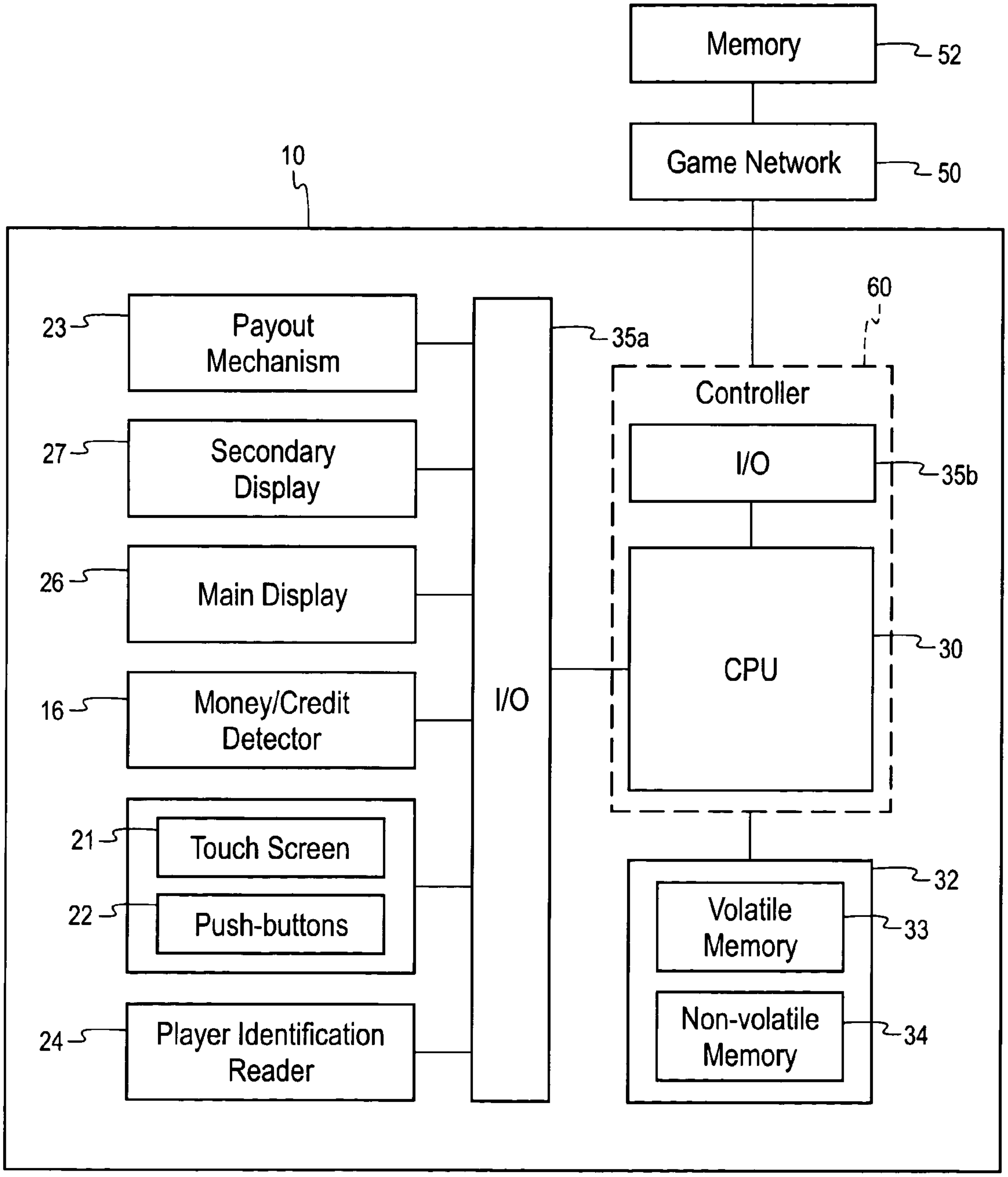
FIG. 2 illustrates a control system that is used in conjunction with the gaming terminal of FIG. 1.

As shown in FIG. 2, the various components of the gaming terminal 10 are controlled by a central processing unit (CPU) 30 (such as a microprocessor or microcontroller). To provide the gaming functions, the CPU 30 executes a game program that allows for the randomly selected outcome. The CPU 30 is also coupled to or includes a local memory 32. The local memory 32 may comprise a volatile memory 33 (e.g., a random-access memory (RAM)) and a non-volatile memory 34 (e.g., an EEPROM). It should be appreciated that the CPU 30 may include one or more microprocessors. Similarly, the local memory 32 may include multiple RAM and multiple program memories.

Communications between the peripheral components of the gaming terminal 10 and the CPU 30 occur through input/output (I/O) circuits 35*a*. As such, the CPU 30 also controls and receives inputs from the peripheral components of the gaming terminal 10. Further, the CPU 30 communicates with external systems via I/O circuits 35*b*. Although the I/O circuits 35*a*, 35*b* may be shown as single blocks, it should be appreciated that the I/O circuits 35*a*, 35*b* may include a number of different types of I/O circuits.

The gaming terminal 10 is typically operated as part of a game control network 50 having control circuitry and memory devices. The game control network 50 may optionally include a system memory 52 for alternative storage of data. The game control network 50 may include instructions for playing games, such as progressive jackpots that are contributed to by all or some of the gaming terminals 10 in the network 50. The gaming terminal 10 often has multiple serial ports, each port dedicated to providing data to a specific host computer system that performs a specific function (e.g., account system, player-tracking system, progressive game control system, etc . . . ). To set up a typical serial communication hardware link to the host system, the typical RS-232 point-to-point communication protocol that is often present in the gaming terminal 10 is converted to an RS-485 (or RS-485-type) master-slave protocol so as to take advantage of some of the advantages of the RS-485 capability (e.g., multi-drop capability that allows many gaming terminals 10 to communicate with the game control network 50). To perform this function, a custom interface board may be used by the gaming terminal 10 for each communication port in the gaming terminal 10. It should be noted that the gaming terminal 10 can initially be designed to be configured for a typical RS485 protocol, instead of the typical RS-232 protocol. Further, the gaming terminal 10 may simply be designed for an Ethernet connection to the game control network 50.

The gaming terminal 10 and associated game control network 50 are capable of executing wagering games on or through a controller 60. Controller 60, as used herein, comprises any combination of hardware, software, and/or firmware that may be disposed or resident inside and/or outside of a gaming terminal 10 or like machine which may communicate with and/or control the transfer of data between the gaming terminal and a bus, another computer, processor, or device, and/or a service and/or a network. The network may include, but is not limited to a peer-to-peer, client/server, master/slave, star network, ring network, bus network, or other network architecture wherein at least one processing device (e.g., computer) is linked to at least one other processing device. The controller 60 may comprise the I/O circuits 35*b* and the CPU 30. In other embodiments, the CPU 30 may be housed outside of the controller 60, and a different processor may be housed within the controller 60. The controller 60, as used herein, may comprise one or more controllers. In one implementation, each gaming terminal 10 comprises, or is connected to, a controller 60, enabling each gaming terminal 10 to transmit and/or receive signals, preferably both, in a peer-to-peer arrangement. In another example, the controller 60 may be adapted to facilitate communication and/or data transfer for one or more gaming terminals 10 in a client/server or centralized arrangement. In one aspect, shown in FIG. 2, the controller 60 may connect the gaming terminal 10 via a conventional I/O port and communication path (e.g. serial, parallel, IR, RC, 10bT, etc.) to the game control network 50, which may include, for example, other gaming terminals connected together in the game control network 50.

Figure 3:
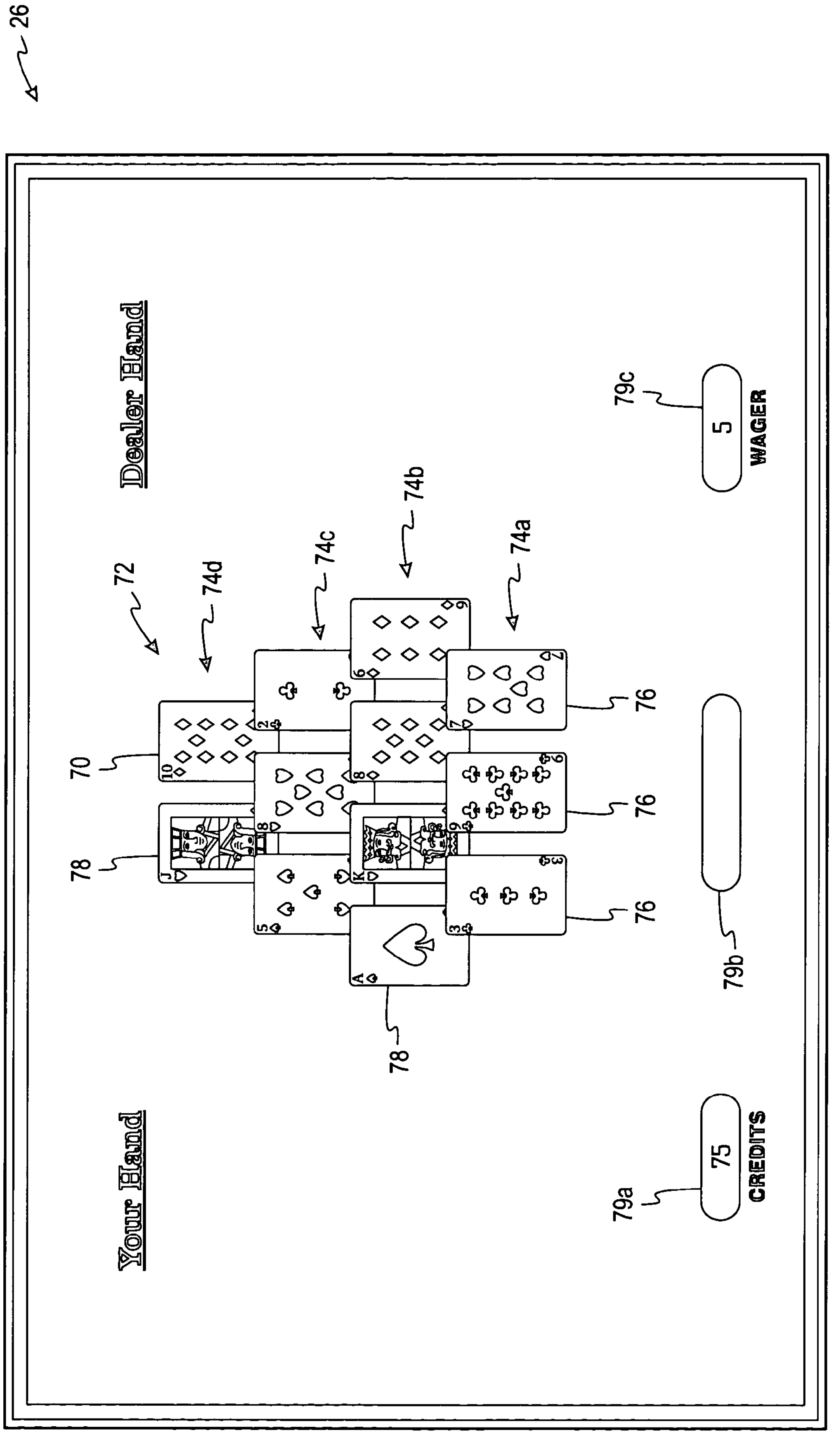
FIG. 3 illustrates an initial screen of the main display of the gaming terminal of FIG. 1.

Turning now to FIG. 3, one embodiment of the main display 26 of the gaming terminal 10 is illustrated. In this embodiment, the player will be playing a blackjack themed game versus a computer dealer. A plurality of cards 70 are arranged in an array 72 on the main display 26. The cards 70 are arranged in four layers 74*a-d*. The cards in the first layer 74*a* overlap the cards in layer 74*b*, which in turn overlap the cards in layer 74*c*, which in turn overlap the cards in layer 74*d*. The cards in the first layer 74*a* are considered "selectable" cards 76, because there are no other cards overlaying them. The cards in the other three layers 74*b*, 74*c*, 74*d* are "non-selectable" cards 78 because at least one card is overlaying them. In other words, the "non-selectable" cards 78 are protected from selection by others of the plurality of cards 70. The main display 26 may also include various other indicators including a credit counter 79*a*, an outcome indicator 79*b*, and a wager indicator 79*c*. The credit counter 79*a* illustrates how many credits a player has left in the gaming terminal 10. The credit counter 79*a* increases whenever the player wins credits, and decreases whenever the player makes a wager.

The wager indicator 79*c* indicates the amount the player has wagered on that particular wagering game and the outcome indicator 79*b* informs the player of the outcome of a particular wagering game or hand, as will be detailed below.

Figure 4:
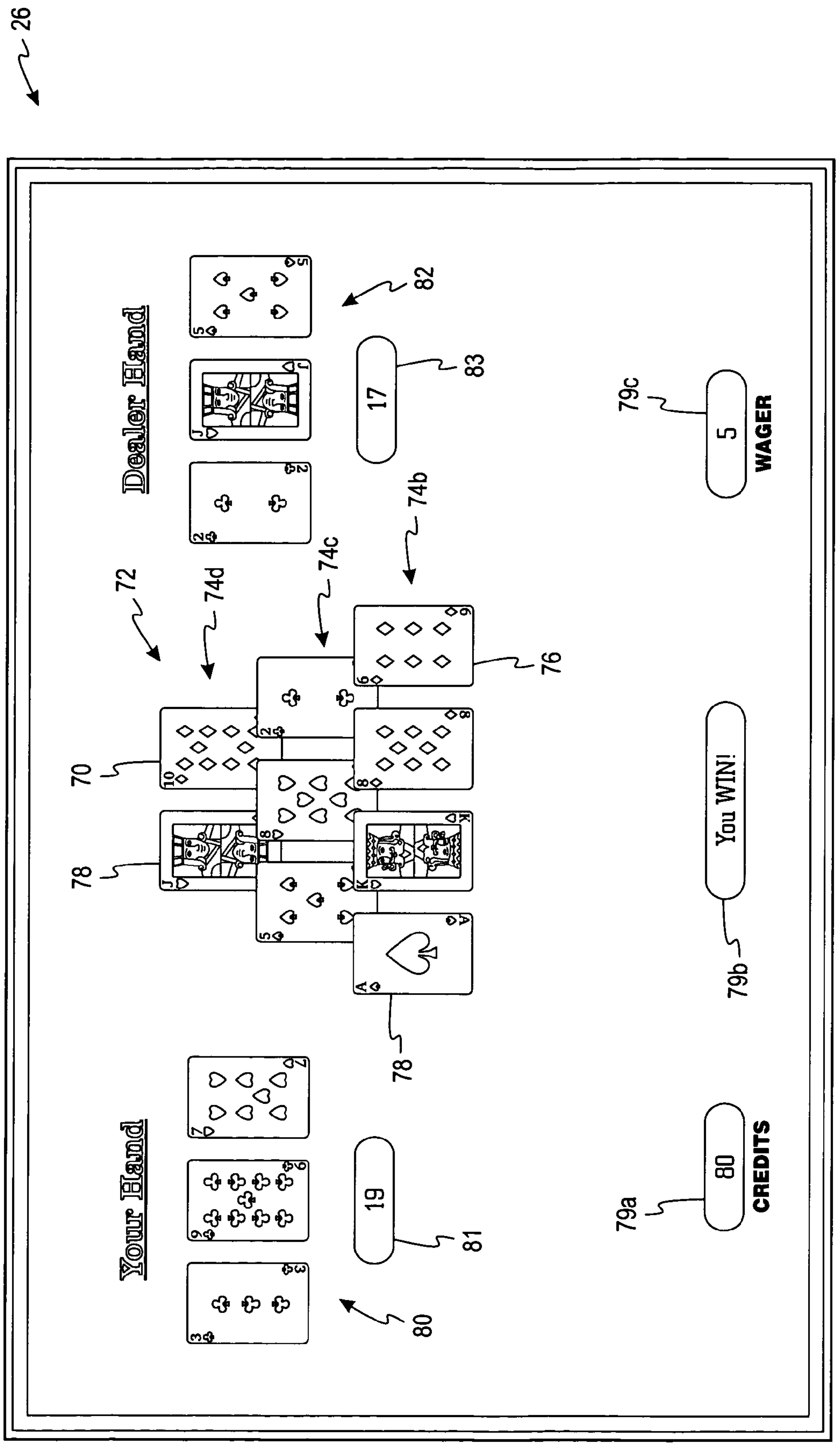
FIG. 4 illustrates a subsequent screen of the main display of the gaming terminal of FIG. 1.

The goal of the game is to clear the entire array 72 while playing multiple hands of blackjack against a dealer. The player selects cards from the array 72 for his or her hand 80. The player may only select "selectable" cards 76. As shown in FIG. 4, once the player has selected his or her hand 80, the dealer is dealt a hand 82. The rules for the dealer obtaining the dealer's hand 82 follows traditional blackjack dealer rules (e.g., must "hit" on anything lower than 17, must "stay" on 17 or over). In this example, the player has selected all three "selectable" cards 76, such that the player's hand 80 equals "19," which is shown to the player in a score box 81. The dealer is dealt a "17," as shown in the main display 26 in a dealer's score box 83. Because the dealer must follow the traditional rules for blackjack, the dealer must stay, and the player wins. An outcome indicator 85 indicates this win to the player. In this embodiment, the player is awarded five credits for the win.

Unlike traditional video blackjack games, the player is able to play again with the array 72 of FIG. 3. Because the player cleared all of the cards 70 in the first layer 74*a*, all of the cards 70 of the second layer 74*b* now become "selectable" cards 76. The player may now select one or more of the "selectable" cards 76 from the second layer 74*b* for his or her next hand.

Figure 5:
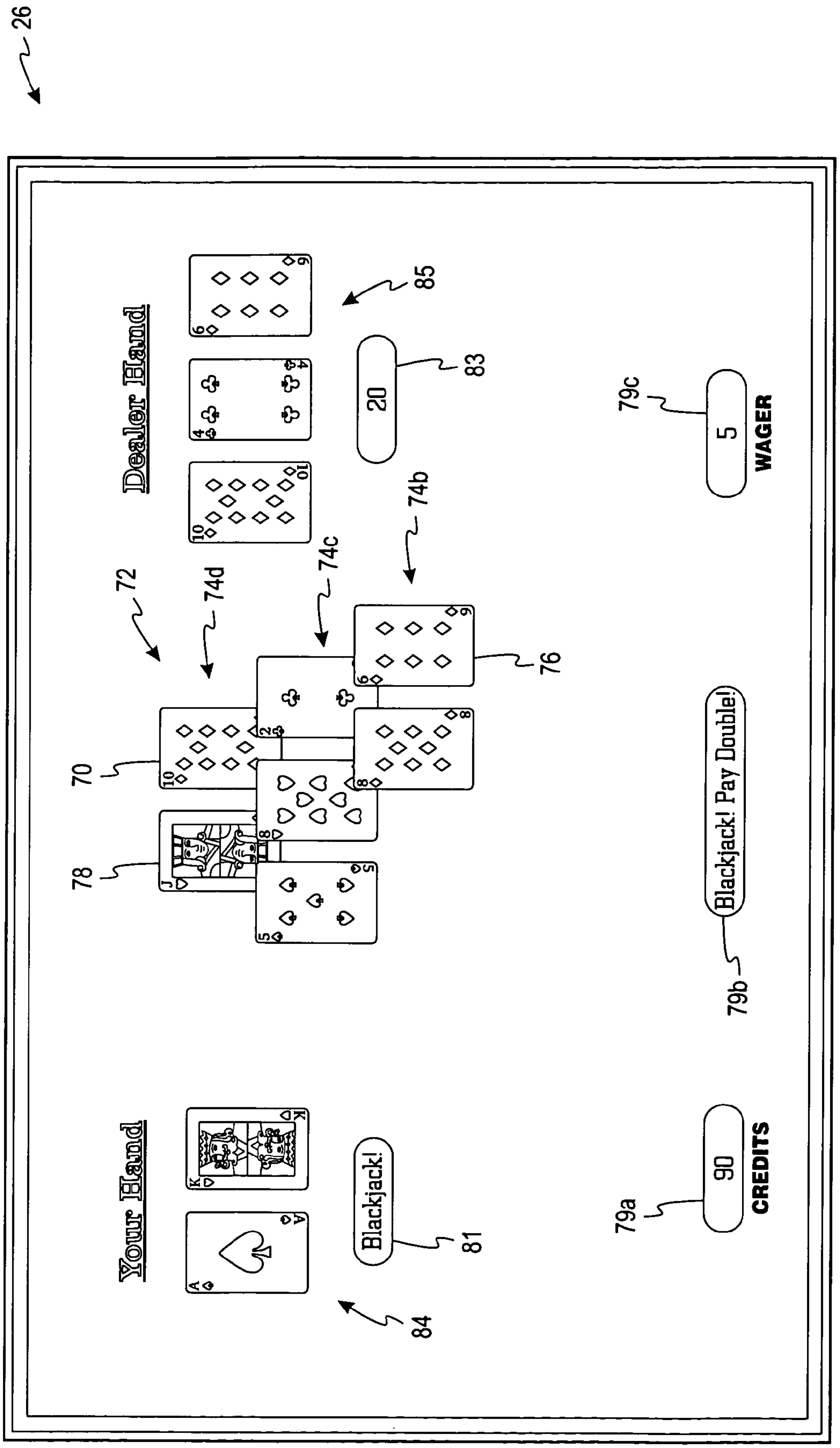
FIG. 5 illustrates another subsequent screen of the main display of the gaming terminal of FIG. 1.

As shown in FIG. 5, the player selects the ace and king from the second layer 74*b* (FIG. 3) for his or her next hand 84. This is known as "blackjack," and is an automatic winning hand, regardless of the cards in the dealer's hand 85. If the player has "blackjack," the player may receive an extra award, usually twice the normal winning payout. Alternatively, the extra award may be entry to a bonus game, a free game, a multiplier or other non-monetary award.

Figure 6:
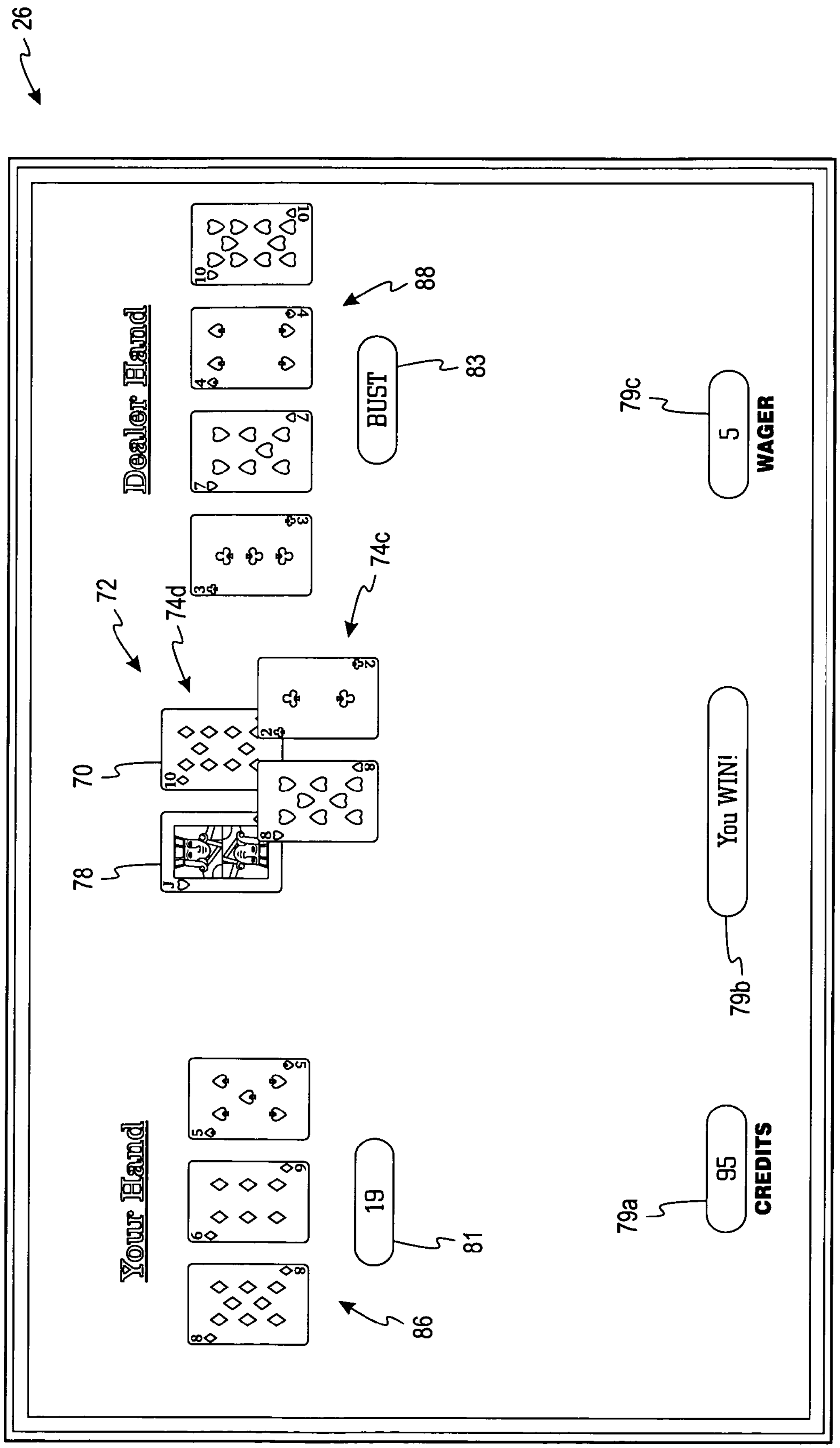
FIG. 6 illustrates yet another subsequent screen of the main display of the gaming terminal of FIG. 1.

Turning now to FIG. 6, the player's next hand 86 is shown based on selections of the selectable cards 76 in FIG. 5. In this hand, the player has selected the eight and six from the second layer 74*b*, as well as the five from the third layer 74*c*, creating a hand having a value of "19." The five is now selectable because, in the previous round, the player removed the ace and the king. The dealer is dealt a three, seven, and a four. Because this totals less than 17, the dealer must accept another card into his or her hand 88. As shown, the next card is a ten, making the dealer's hand 88 a "bust." The player is granted more awards, and can select more cards for his or her next hand.

Figure 7:
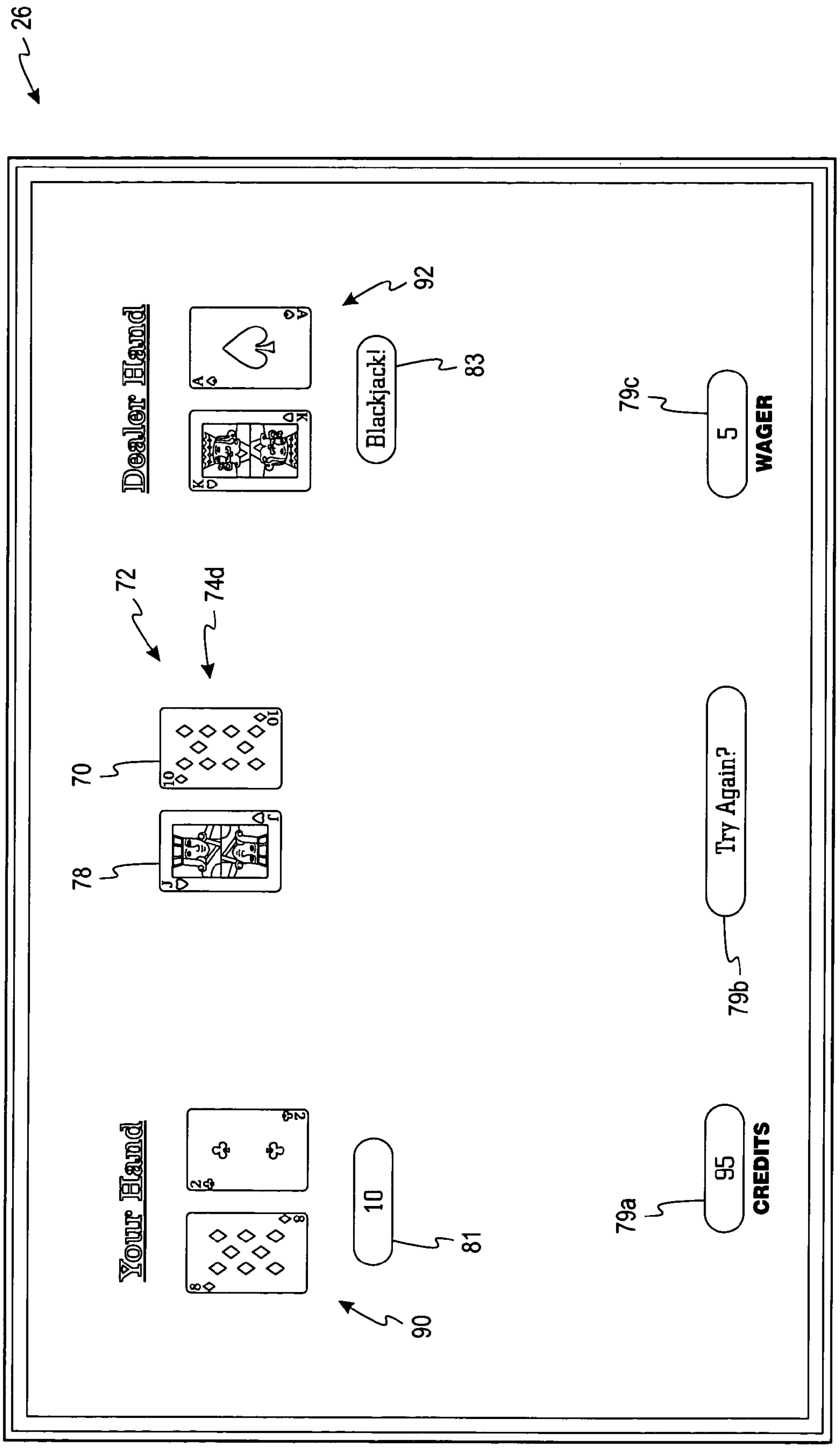
FIG. 7 illustrates another subsequent screen of the main display of the gaming terminal of FIG. 1.

As shown in FIG. 7, the eight and the two in the third layer 74*c* are the only "selectable" cards for the player to select as part of the player's hand 90. In this round, the dealer's hand 92 beats the player's hand 90. The game is over and the player is invited to play again.

In an alternative embodiment, once the player selects the eight and the two, the cards in the fourth layer 74*d* become selectable. In other words, the player may also select the jack to make a hand of twenty.

In some embodiments, the player may be granted extra credits or non-monetary awards for achieving blackjack, clearing levels of cards, or for the number of cards played before losing. In other embodiments, the player may only be awarded credits for each winning hand. If the player was to clear the entire array 72, the player may be granted a bonus award. Alternatively, a new array may be displayed for the player to play. In those embodiments, the player is able to keep playing until he or she loses, adding more excitement to the wagering game.

One of the benefits of this wagering game is that the player can see all of his or her card options and plot a strategy for how to play the game. The player can select some low card combinations, hoping that the dealer will "bust," in order to save some better card combinations for later in the game. Alternatively, the player can always select the highest card combination without regard for the next round. Another benefit of this embodiment of the present invention is that the player will never "bust," increasing the player's perception of achieving a win.

Figure 8:
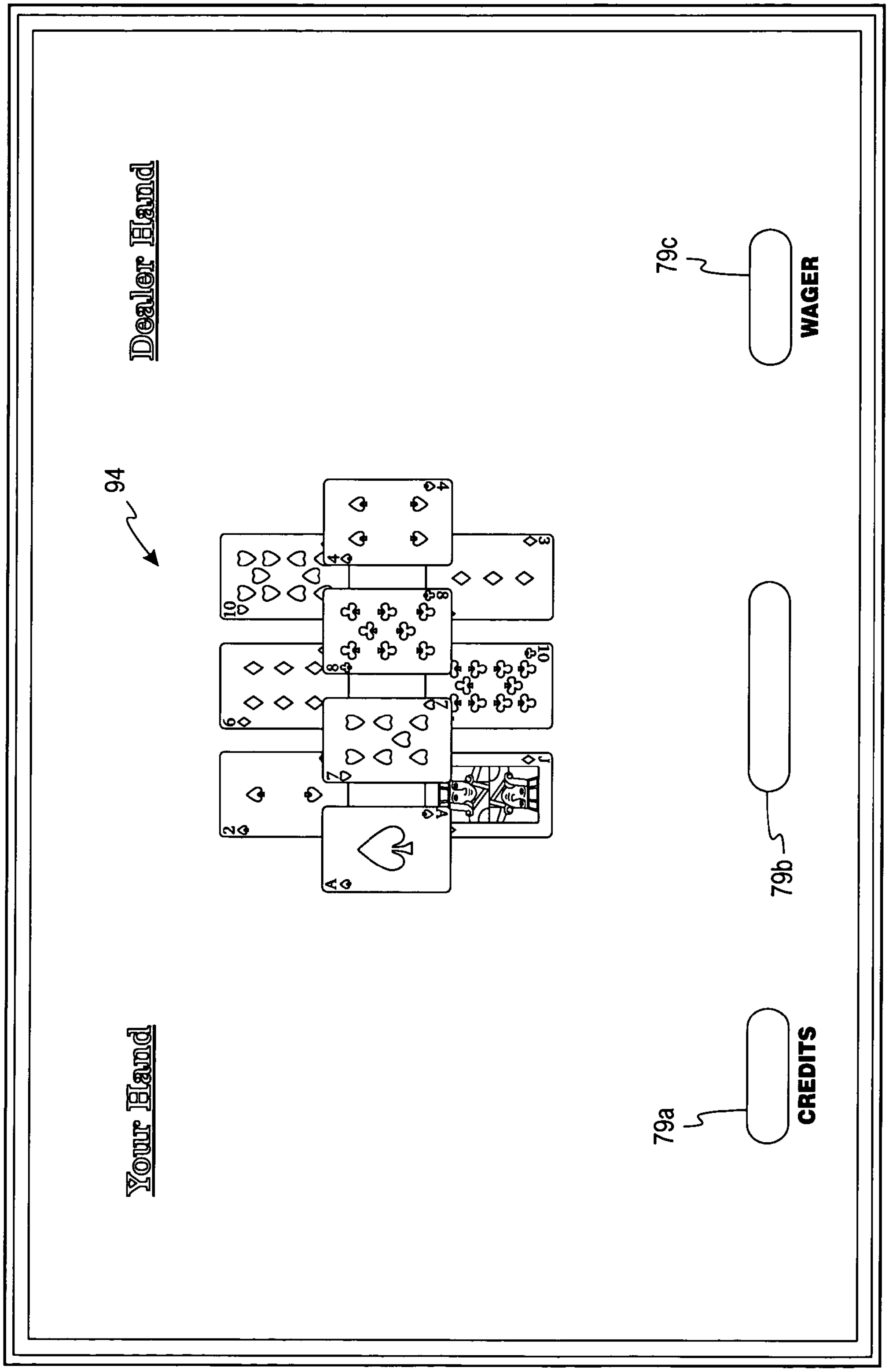
FIG. 8 illustrates a screen of the main display according to another embodiment of a wagering game of the gaming terminal of FIG. 1.

FIG. 8 illustrates an alternate array 94 that may be utilized in playing the wagering game described above. Many other arrays may also be used so long as the arrays have a plurality of cards and that at least one of the cards is covered by other cards to create "selectable" and "non-selectable" cards.

In some of the embodiments where a new array is displayed once a player clears the array 72, the new array may be geometrically different than the first array 72. In others the new array is geometrically the same as the first array 72.

Figure 9:
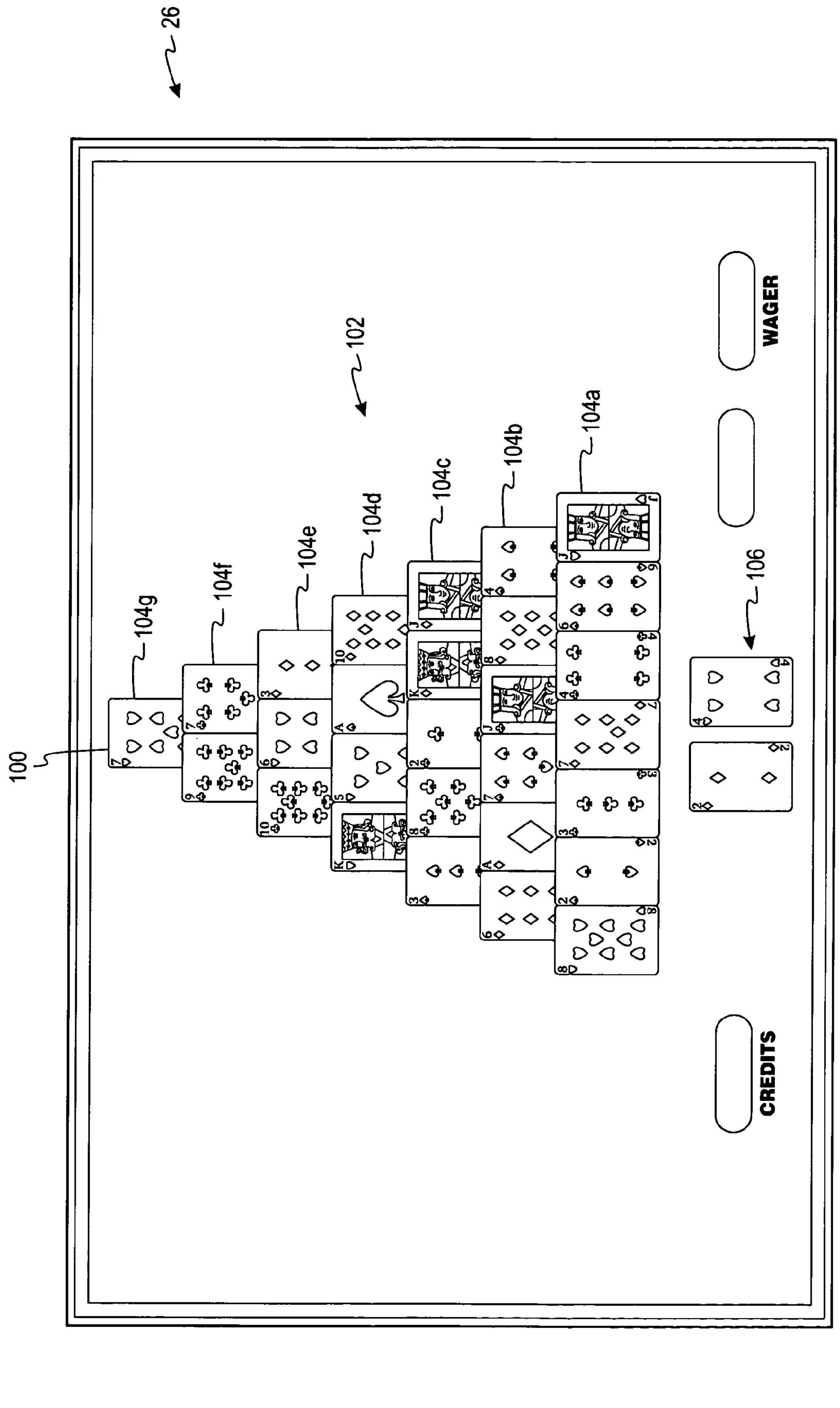
FIG. 9 illustrates a screen of the main display according to yet another embodiment of a wagering game of the gaming terminal of FIG. 1.

Turning now to FIG. 9, another embodiment of the present invention will be described. In this embodiment, the plurality of cards 100 is arranged in a pyramid 102. There are seven layers 104*a*-104*g* of cards 100 in the pyramid 102, totaling 28 cards. The 28 cards are dealt from a deck of 52 cards. In this embodiment, only the cards in the first layer 104*a* are "selectable" as that term is defined above. As shown, the cards in the remaining layers 104*b-g* are protected from selection by others of the cards 100. In other embodiments, each layer of cards may be partially overlayed by a prior layer of cards. The cards that are not dealt into the pyramid 102 are kept in a waste pile 106.

In this embodiment, the card game being played is a form of solitaire sometimes called "pyramid solitaire." The object of the game is to remove all of the cards from the pyramid 102 and from the waste pile 106. The player does this by removing pairs of cards totaling thirteen (or other predetermined number). An ace is worth one, number cards are worth their face value, jacks are worth eleven, queens worth twelve and kings are worth thirteen (and so may be removed singly). The player must match the "selectable" cards with either other "selectable" cards or with a card from the waste pile 106.

Figure 10:
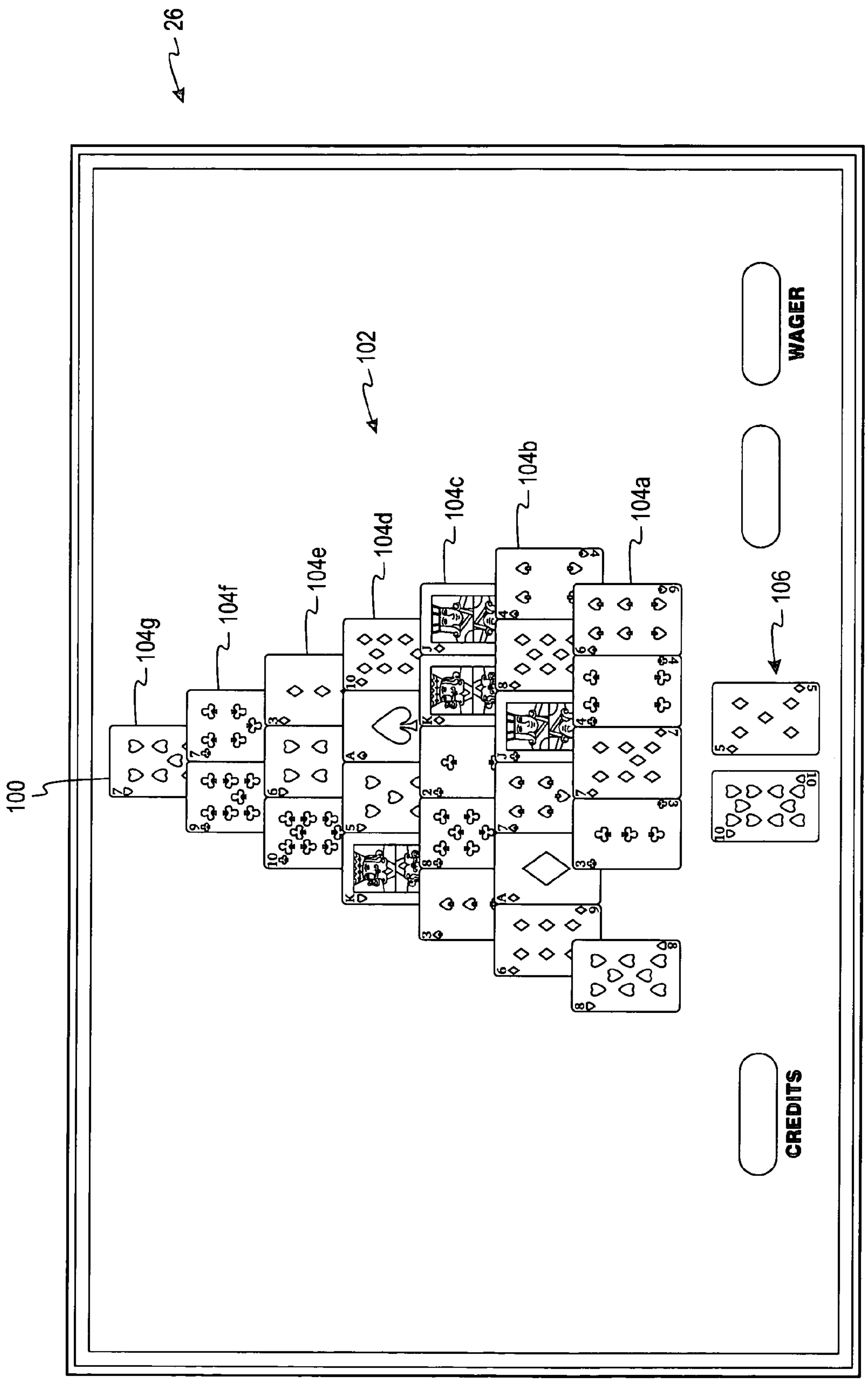
FIG. 10 illustrates a subsequent screen of the main display of the embodiment shown in FIG. 9.

In the illustrated embodiment, the player may select the two of hearts and the jack of spades. Next, as shown in FIG. 10, the player flips through the cards in the waste pile 106, until he or she selects the ten of hearts to match the three of clubs. This continues until the player either clears both the pyramid 102 and the waste pile 106 or there are no more matches that can be made. The player is allowed to show two cards from the waste pile 106 at a time, so that two cards from the waste pile 106 can be removed at once.

In some embodiments, a single wager may enable the player to play the entire pyramid 102. In other words, after placing the wager, the player continues to play until the pyramid 102 is cleared or until there are no more matches to be made. In other embodiments, the player may place a separate wager for each match.

The player may earn credits for every pair cleared, every layer removed, and/or for clearing the entire pyramid 102. After the pyramid 102 is cleared, the player may win a bonus award. In other embodiments, after the pyramid 102 is cleared, another pyramid may be displayed.

The two card games described above are examples of the present invention. Numerous other games involving an array of cards with "selectable" and "non-selectable" cards may are also contemplated. For example, a poker game may be played, with the player having to select his or her five card stud hand from the array.

In another embodiment of the invention, the cards may cascade down automatically into a hand. For example, in a poker game, first, the player selects the five selectable cards for his or her first hand. After the cards are selected, some previously unselectable cards become selectable. In the next hand, instead of the player choosing the cards, five of the selectable cards automatically cascade down into a hand. If more than five cards are currently selectable, the gaming machine may randomly pick five cards or the gaming machine may pick the five cards that would create the best hand.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A method of playing a card-based wagering game at a gaming terminal, the method comprising the acts of:

receiving a wager via an input interface associated with the gaming terminal;

displaying, on a display associated with the gaming terminal, a plurality of first cards initially arranged as a pyramid in an array having multiple rows of cards, a top row of the array having one face-up card and each immediately lower row of the array having the same number of face-up cards as the immediately previous row plus one additional face-up card, a bottom row in the array having one more face-up card than the row of cards immediately above the bottom row, the bottom row in the array being the only row of cards in the array that are initially selectable;

displaying, on the display, a plurality of second cards initially arranged as one or more stacks of cards with the top card in each stack being face-up, wherein each face-up top card of the second cards is selectable, each of the first cards and the second cards having a rank;

using the input interface, selecting an initial round of one or more cards from the selectable first cards or the selectable second cards such that selecting the initial round occurs after the displaying of the plurality of first cards and the displaying of the plurality of second cards;

using a processor associated with the gaming terminal, determining an outcome based on the ranks of the selected initial round of one or more cards;

if the outcome based on the ranks is a predetermined outcome, removing the initial round of one or more cards, wherein if a selectable card from the second cards was selected, the card below the selected card from the stack of cards becomes the new top card, and wherein if the cards from the bottom row of the array are all removed, the row of cards immediately above the initial bottom row of the array become selectable;

repeating the selecting, determining, and removing acts until no subsequent round of one or more cards has a predetermined outcome or until all of the plurality of first cards are removed; and awarding a first award for removing all of the plurality of first cards.

2. The method of claim 1, wherein the multiple rows of cards in the array are overlapping.

3. The method of claim 1, further comprising the act of awarding a second award for each row of cards removed from the array.

4. The method of claim 3, wherein the second award is a monetary award.

5. The method of claim 1, further comprising the act of awarding a third award for each round of one or more cards removed from the first array.

6. The method of claim 5, wherein the third award is a monetary award and a separate wager is received for the selection of each round of one or more cards.

7. The method of claim 1, wherein the first award is a monetary award.

8. The method of claim 1, wherein the card-based game is solitaire.

9. The method of claim 1, wherein the predetermined outcome is a sum of the ranks of the one or more selected cards for each round totaling thirteen, the rank of each numbered card being its face value, the rank of jacks being eleven, the rank of queens being twelve, and the rank of kings being thirteen.

10. A gaming system for playing a card-based wagering game, the system comprising:

a gaming terminal having an input device for receiving inputs from a player during the wagering game, the inputs including a wager amount; and at least one display configured for displaying a plurality of first cards initially arranged as a pyramid in an array having multiple rows of cards, a top row of the array having one face-up card and each immediately lower row of the array having the same number of face-up cards as the immediately previous row plus one additional face-up card, a bottom row in the array having one more face-up card than the row of cards immediately above the bottom row, the bottom row in the array being the only row of cards in the array that are initially selectable, the display further configured for displaying a plurality of second cards initially arranged as one or more stacks of cards with the top card in each stack being face-up, wherein each face-up top card of the second cards is selectable, each of the first cards and the second cards having a predetermined value;

a controller associated with the gaming terminal, the controller coupled to the input device and the at least one display, the controller configured to:

receive the selection of an initial round of one or more cards from the selectable first cards or the selectable second cards such that receiving the selection of the initial round occurs after the displaying of the plurality of first cards and the displaying of the plurality of second cards;

determine the outcome of the predetermined values of the selected initial round of one or more cards;

if the outcome of the predetermined values is a predetermined outcome, remove the initial round of one or more cards, wherein if a selectable card from the second cards was selected, the card below the selected card from the stack of cards becomes the new top card, and wherein if the cards from the bottom row of the array are all removed, the row of cards immediately above the initial bottom row of the array become selectable;

repeat the receiving, determining, and removing processes until no subsequent round of one or more cards has a predetermined outcome or until all of the plurality of first cards are removed; and award a first award for removing all of the plurality of first cards.

11. The gaming system of claim 10, wherein the displayed multiple rows of cards in the array are overlapping.

12. The gaming system of claim 10, wherein the controller is further configured to award a second award for each row of cards removed from the array.

13. The gaming system of claim 10, wherein the controller is further configured to award a third award for each round of one or more cards removed from the array.

14. The gaming system of claim 10, wherein the first award is a monetary award.

15. The gaming system of claim 10, wherein the third award is a monetary award, and a separate wager is received via the input device or another user input device for the selection of each round of one or more cards.

16. The gaming system of claim 10, wherein the controller is external to the gaming terminal.

17. A computer readable storage medium encoded with instructions, which when executed by at least one processor associated with a gaming device, cause the processor to accomplish steps comprising:

receiving a wager via an input interface;

displaying a plurality of first cards initially arranged as a pyramid in an array having multiple rows of cards, a top row of the array having one face-up card and each immediately lower row of the array having the same number of face-up cards as the immediately previous row plus one additional face-up card, a bottom row in the array having one more face-up card than the row of cards immediately above the bottom row, the bottom row in the array being the only row of cards in the array that are initially selectable;

displaying a plurality of second cards initially arranged as one or more stacks of cards with the top card in each stack being face-up, wherein each face-up top card of the second cards is selectable, each of the first cards and the second cards having a rank;

receiving a selection of an initial round of one or more cards from the selectable first cards or the selectable second cards such that receiving the selection of the initial round occurs after the displaying of the plurality of first cards and the displaying of the plurality of second cards;

determining an outcome based on the ranks of the received selection of the initial round of one or more cards;

if the outcome is a predetermined outcome, removing the initial round of one or more cards, wherein if a selectable card from the second cards was selected, the card below the selected card from the stack of cards becomes the new top card, and wherein if the cards from the bottom row of the array are all removed, the row of cards immediately above the initial bottom row of the array become selectable;

repeating the receiving, determining, and removing steps until no subsequent round of one or more cards has a predetermined outcome or until all of the plurality of first cards are removed; and awarding a first award for removing all of the plurality of first cards.

18. The computer readable storage medium of claim 17, furthering comprising the step of awarding a second award for each row of cards removed from the array.

19. The computer readable storage medium of claim 17, furthering comprising the step of awarding a third award for each round of one or more cards removed from the array.

20. The computer readable storage medium of claim 19, wherein the third award is a monetary award, and further comprising the step of receiving a separate wager for the selection of each round of one or more cards.

* * * * *